United States Patent
Ge et al.

(10) Patent No.: US 10,133,578 B2
(45) Date of Patent: Nov. 20, 2018

(54) SYSTEM AND METHOD FOR AN ASYNCHRONOUS PROCESSOR WITH HETEROGENEOUS PROCESSORS

(71) Applicant: Huawei Technologies Co., Ltd., Shenzhen (CN)

(72) Inventors: Yiqun Ge, Kanata (CA); Wuxian Shi, Kanata (CA); Qifan Zhang, Lachine (CA); Tao Huang, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 445 days.

(21) Appl. No.: 14/480,541

(22) Filed: Sep. 8, 2014

(65) Prior Publication Data

US 2015/0074378 A1   Mar. 12, 2015

Related U.S. Application Data (60) Provisional application No. 61/874,839, filed on Sep. 6, 2013.

(51) Int. Cl.
*G06F 9/30* (2018.01)
*G06F 9/38* (2018.01)

(52) U.S. Cl.
CPC .......... *G06F 9/3836* (2013.01); *G06F 9/3001* (2013.01); *G06F 9/30145* (2013.01); *G06F 9/3838* (2013.01); *G06F 9/3871* (2013.01)

(58) Field of Classification Search
CPC .. G06F 9/3001; G06F 9/30145; G06F 9/3838; G06F 9/3836

(Continued)

(56) References Cited

U.S. PATENT DOCUMENTS 5,434,520 A * 7/1995 Yetter .................. G06F 7/5016
  326/93
5,553,276 A * 9/1996 Dean .................... G06F 9/3871
  712/E9.063

(Continued)

FOREIGN PATENT DOCUMENTS

EP    0429733 B1    4/1999

OTHER PUBLICATIONS

Laurence, "Low-Power High-Performance Asynchronous General Purpose ARMv7 Processor for Multi-core Applications," presentation slides, 13th Int'l Forum on Embedded MPSoC and Multicore, Jul. 2013, Octasic Inc., 52 pages.*

(Continued)

*Primary Examiner* — Yuqing Xiao
(74) *Attorney, Agent, or Firm* — Slater Matsil, LLP (57) ABSTRACT

Embodiments are provided for an asynchronous processor with heterogeneous processors. In an embodiment, the apparatus for an asynchronous processor comprises a memory configured to cache instructions, and a first unit (XU) configured to processing a first instruction of the instructions. The apparatus also comprises a second XU having less restricted access than the first XU to a resource of the asynchronous processor and configured to process a second instruction of the instructions. The second instruction requires access to the resource. The apparatus further comprises a feedback engine configured to decode the first instruction and the second instruction, and issue the first instruction to the first XU, and a scheduler configured to send the second instruction to the second XU.

17 Claims, 9 Drawing Sheets

(58) Field of Classification Search
USPC .......................................................... 712/214
See application file for complete search history.

(56) References Cited

U.S. PATENT DOCUMENTS

| | | | | |
|---|---|---|---|---|
| 5,790,560 | A * | 8/1998 | Durham | G01R 31/2882 365/201 |
| 5,920,899 | A * | 7/1999 | Chu | G06F 5/08 711/169 |
| 6,728,206 | B1 | 4/2004 | Carlson | |
| 6,867,620 | B2 * | 3/2005 | Singh | G06F 9/3871 326/112 |
| 7,484,078 | B2 * | 1/2009 | Bink | G06F 9/3824 712/218 |
| 7,971,038 | B2 * | 6/2011 | Wielage | G06F 7/00 326/93 |
| 8,402,164 | B1 | 3/2013 | Parlour et al. | |
| 8,448,105 | B2 * | 5/2013 | Dimou | G06F 9/3869 716/103 |
| 2002/0062427 | A1 * | 5/2002 | Chauvel | G06F 1/206 711/151 |
| 2002/0087828 | A1 * | 7/2002 | Arimilli | G06F 15/8007 712/32 |
| 2002/0156995 | A1 * | 10/2002 | Martin | G06F 9/3824 712/201 |
| 2004/0225868 | A1 | 11/2004 | Kim et al. | |
| 2005/0081020 | A1 | 4/2005 | Volp | |
| 2006/0155958 | A1 | 7/2006 | Duller et al. | |
| 2006/0179196 | A1 * | 8/2006 | Gray | G06F 13/14 710/240 |
| 2009/0177843 | A1 * | 7/2009 | Wallach | G06F 12/0844 711/131 |
| 2012/0066483 | A1 | 3/2012 | Boury et al. | |
| 2013/0151817 | A1 * | 6/2013 | Lahteenmaki | G06F 9/30087 712/208 |
| 2014/0164734 | A1 * | 6/2014 | Muff | G06F 9/3836 712/16 |

OTHER PUBLICATIONS

Michel Laurence, "Introduction to Octasic Asynchronous Processor Technology," May 2012, IEEE 18th International Symposium on Asynchronous Circuits and Systems, pp. 113-117.*

Hennessy et al., "Computer Architecture—A Quantitative Approach," May 2002, 3rd ed., pp. 231-247.*

International Search Report received in PCT/US2014/05469, dated Dec. 23, 2014, 9 pages.

* cited by examiner

FIG. 1

PRIOR ART

SYSTEM AND METHOD FOR AN ASYNCHRONOUS PROCESSOR WITH HETEROGENEOUS PROCESSORS

This application claims the benefit of U.S. Provisional Application No. 61/874,839 filed on Sep. 6, 2013 by Yiqun Ge et al. and entitled "Method and Apparatus for Asynchronous Processor with Heterogeneous Processors," which is hereby incorporated herein by reference as if reproduced in its entirety.

TECHNICAL FIELD

The present invention relates to asynchronous processing, and, in particular embodiments, to system and method for an asynchronous processor with heterogeneous processors.

BACKGROUND

Micropipeline is a basic component for asynchronous processor design. Important building blocks of the micropipeline include the RENDEZVOUS circuit such as, for example, a chain of Muller-C elements. A Muller-C element can allow data to be passed when the current computing logic stage is finished and the next computing logic stage is ready to start. Instead of using non-standard Muller-C elements to realize the handshaking protocol between two clockless (without using clock timing) computing circuit logics, the asynchronous processors replicate the whole processing block (including all computing logic stages) and use a series of tokens and token rings to simulate the pipeline. Each processing block contains a token processing logic to control the usage of tokens without time or clock synchronization between the computing logic stages. Thus, the processor design is referred to as an asynchronous or clockless processor design. The token ring regulates the access to system resources. The token processing logic accepts, holds, and passes tokens between each other in a sequential manner. When a token is held by a token processing logic, the block can be granted the exclusive access to a resource corresponding to that token, until the token is passed to a next token processing logic in the ring. There is a need for an improved and more efficient asynchronous processor architecture such as a processor capable for computations with less latency or delay.

SUMMARY OF THE INVENTION

In accordance with an embodiment, a method performed by an asynchronous processor includes receiving, at a feedback engine of the asynchronous processor, a plurality of instructions from a memory, decoding, at the feedback engine, the instructions, and issuing a first instruction from the decoded instructions to a first execution unit (XU) having computation capability and logic. The method further includes sending, via a scheduler, a second instruction requiring a resource to a second XU. The second XU has less restricted access than the first XU to a resource used for processing the second instruction.

In accordance with another embodiment, a method performed by an asynchronous processor includes decoding, at a feedback engine, a plurality of instructions, and issuing a first instruction of the instructions to a first arithmetic and logic unit (ALU). The method further includes sending, via a scheduler, a second instruction of the instructions requiring access to a resource of the asynchronous processor to a second ALU that has less restricted access than the first ALU to the resource. The first instruction is scheduled at the first ALU using a pre-defined token gating and passing logic. The second instruction is processed at the second ALU using resource pre-defined token gating and passing logic.

In accordance with yet another embodiment, an apparatus for an asynchronous processor comprises a memory configured to cache instructions, and a first XU configured to processing a first instruction of the instructions. The apparatus also comprises a second XU having less restricted access than the first XU to a resource of the asynchronous processor and configured to process a second instruction of the instructions. The second instruction requires access to the resource. The apparatus further comprises a feedback engine configured to decode the first instruction and the second instruction, and issue the first instruction to the first XU, and a scheduler configured to send the second instruction to the second XU.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
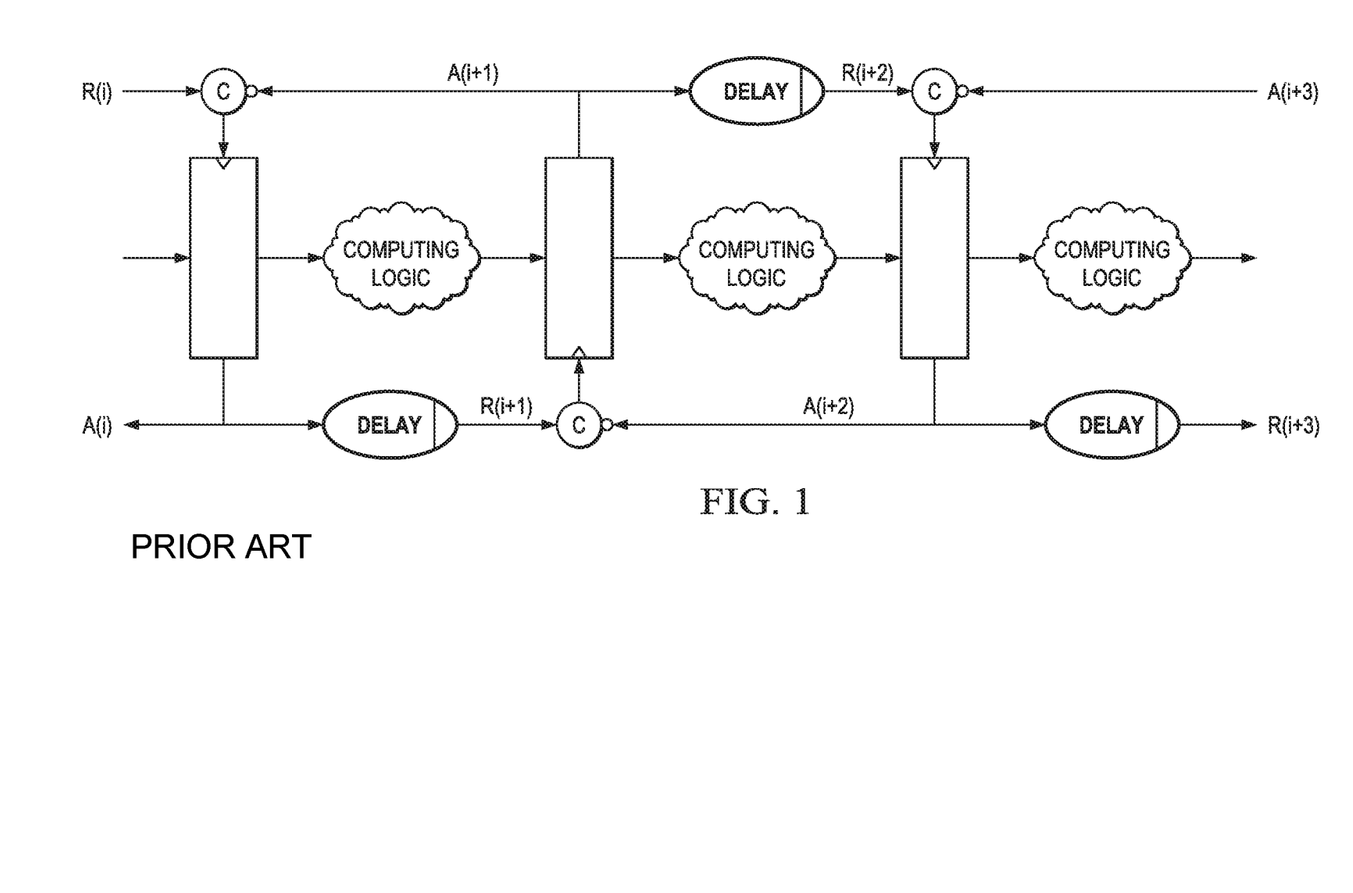
FIG. 1 illustrates a Sutherland asynchronous micropipeline architecture.

FIG. 1 illustrates a Sutherland asynchronous micropipeline architecture. The Sutherland asynchronous micropipeline architecture is one form of asynchronous micropipeline architecture that uses a handshaking protocol to operate the micropipeline building blocks. The Sutherland asynchronous micropipeline architecture includes a plurality of computing logics linked in sequence via flip-flops or latches. The computing logics are arranged in series and separated by the latches between each two adjacent computing logics. The handshaking protocol is realized by Muller-C elements (labeled C) to control the latches and thus determine whether and when to pass information between the computing logics. This allows for an asynchronous or clockless control of the pipeline without the need for timing signal. A Muller-C element has an output coupled to a respective latch and two inputs coupled to two other adjacent Muller-C elements, as shown. Each signal has one of two states (e.g., 1 and 0, or true and false). The input signals to the Muller-C elements are indicated by A(i), A(i+1), A(i+2), A(i+3) for the backward direction and R(i), R(i+1), R(i+2), R(i+3) for the forward direction, where i, i+1, i+2, i+3 indicate the respective stages in the series. The inputs in the forward direction to Muller-C elements are delayed signals, via delay logic stages The Muller-C element also has a memory that stores the state of its previous output signal to the respective latch. A Muller-C element sends the next output signal according to the input signals and the previous output signal. Specifically, if the two input signals, R and A, to the Muller-C element have different state, then the Muller-C element outputs A to the respective latch. Otherwise, the previous output state is held. The latch passes the signals between the two adjacent computing logics according to the output signal of the respective Muller-C element. The latch has a memory of the last output signal state. If there is state change in the current output signal to the latch, then the latch allows the information (e.g., one or more processed bits) to pass from the preceding computing logic to the next logic. If there is no change in the state, then the latch blocks the information from passing. This Muller-C element is a non-standard chip component that is not typically supported in function libraries provided by manufacturers for supporting various chip components and logics. Therefore, implementing on a chip the function of the architecture above based on the non-standard Muller-C elements is challenging and not desirable.

Figure 2:
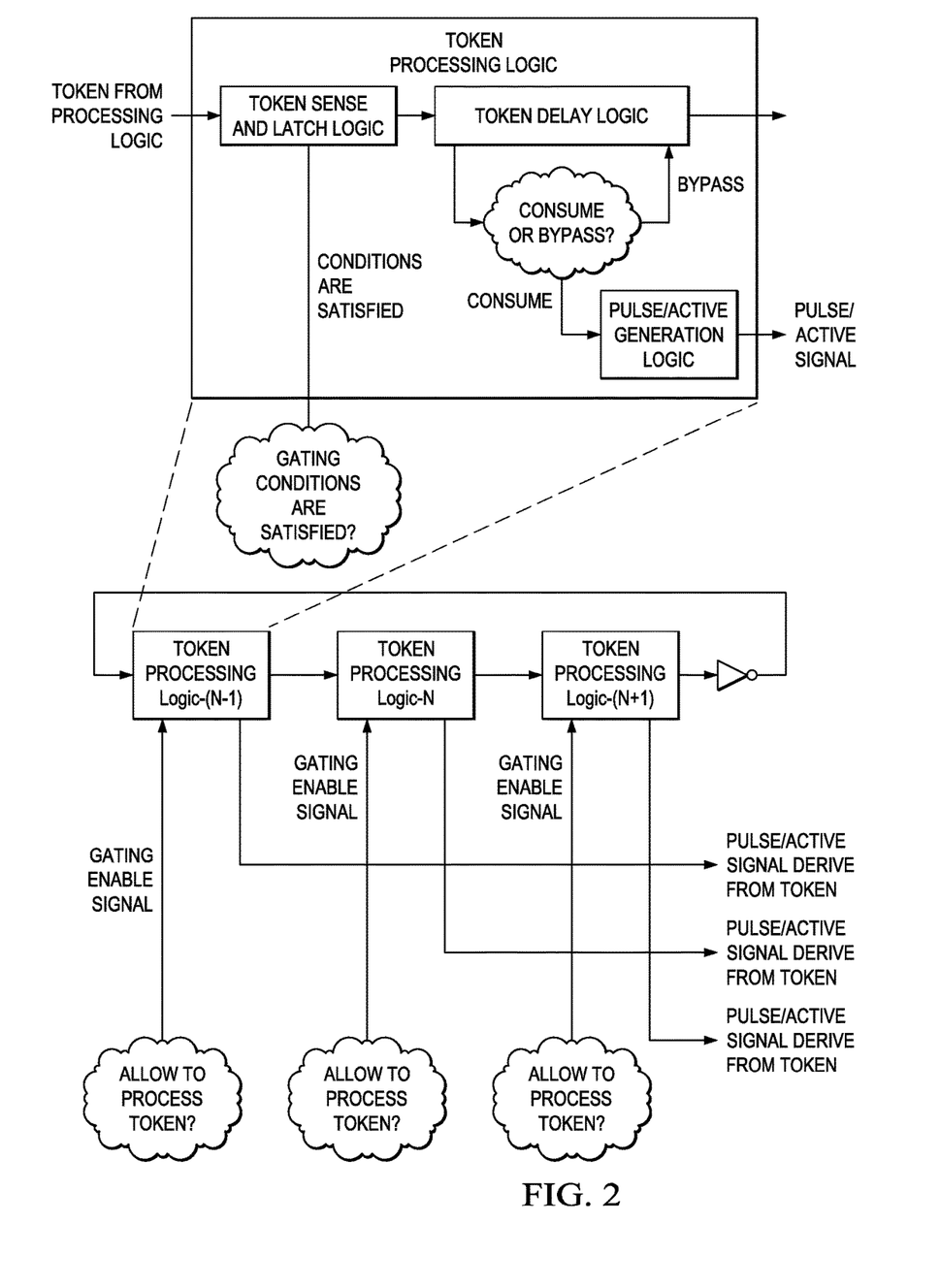
FIG. 2 illustrates a token ring architecture.

FIG. 2 illustrates an example of a token ring architecture which is a suitable alternative to the architecture above in terms of chip implementation. The components of this architecture are supported by standard function libraries for chip implementation. As described above, the Sutherland asynchronous micropipeline architecture requires the handshaking protocol, which is realized by the non-standard Muller-C elements. In order to avoid using Muller-C elements (as in FIG. 1), a series of token processing logics are used to control the processing of different computing logics (not shown), such as processing units on a chip (e.g., ALUs) or other functional calculation units, or the access of the computing logics to system resources, such as registers or memory. To cover the long latency of some computing logics, the token processing logic is replicated to several copies and arranged in a series of token processing logics, as shown. Each token processing logic in the series controls the passing of one or more token signals (associated with one or more resources). A token signal passing through the token processing logics in series forms a token ring. The token ring regulates the access of the computing logics (not shown) to the system resource (e.g., memory, register) associated with that token signal. The token processing logics accept, hold, and pass the token signal between each other in a sequential manner. When a token signal is held by a token processing logic, the computing logic associated with that token processing logic is granted the exclusive access to the resource corresponding to that token signal, until the token signal is passed to a next token processing logic in the ring. Holding and passing the token signal concludes the logic's access or use of the corresponding resource, and is referred to herein as consuming the token. Once the token is consumed, it is released by this logic to a subsequent logic in the ring.

Figure 3:
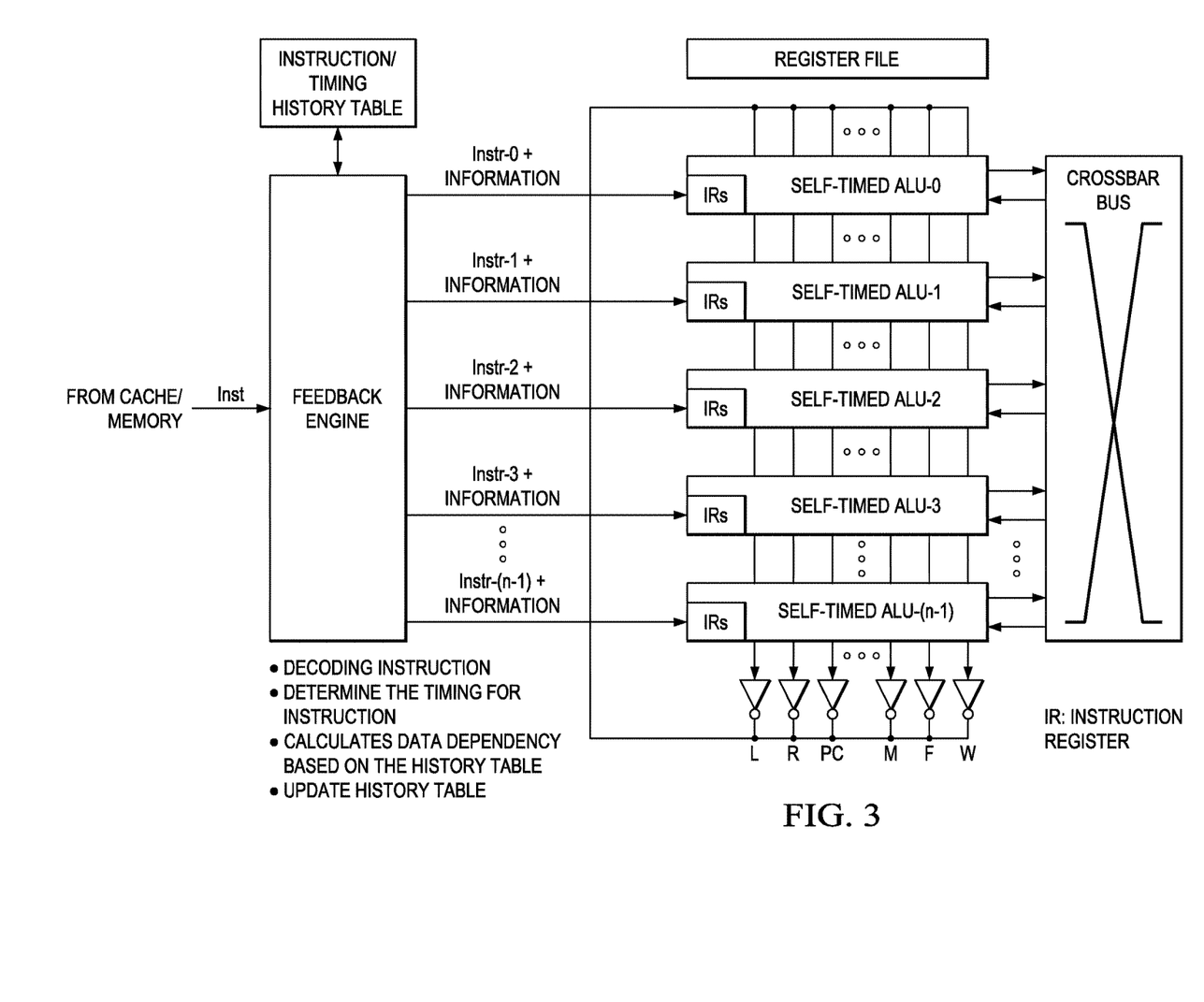
FIG. 3 illustrates an asynchronous homogeneous processor architecture.

FIG. 3 illustrates an asynchronous processor architecture. The architecture includes a plurality of self-timed (asynchronous) arithmetic and logic units (ALUs) coupled in parallel in a token ring architecture as described above. The ALUs can comprise or correspond to the token processing logics of FIG. 2. The asynchronous processor architecture of FIG. 3 also includes a feedback engine for properly issuing (distributing) instructions to the ALUs, an instruction/timing history table accessible by the feedback engine for determining the distribution of instructions, a register (memory) accessible by the ALUs, and a crossbar bus for exchanging needed information between the ALUs. The ALUs also include corresponding instruction registers (IRs) for caching the instructions issued from the feedback engine. The crossbar bus can bypass and forward information between the ALUs. The table is used for indicating timing and dependency information between multiple input instructions to the processor system. The instructions from the instruction cache/memory go through the feedback engine which detects or calculates the data dependencies and determines the timing for instructions using the history table. The feedback engine pre-decodes each instruction to decide how many input operands this instruction requires. The feedback engine then looks up the history table to find whether this piece of data is on the crossbar bus or on the register file. If the data is found on the crossbar bus, the feedback engine calculates which ALU produces the data. This information is tagged to the instruction dispatched to the ALUs. The feedback engine also updates accordingly the instruction/timing history table, which is used to detect the data hazard (contention of resources for the data) and data dependency. The architecture above is referred to as a homogeneous architecture, where the ALUs are configured similarly and access the same resources using a same token system or token base pipelining. Each of the ALUs provides identical functionality. For example, each ALU may provide arithmetic and logic computations, but may lack the ability to unilaterally perform other operations. For instance, the ALUs may be required to access external resources (memory, read, write) to read or write data to the crossbar bus. Access to these external resources is controlled or scheduled using the token-based pipeline described herein.

Figure 4:
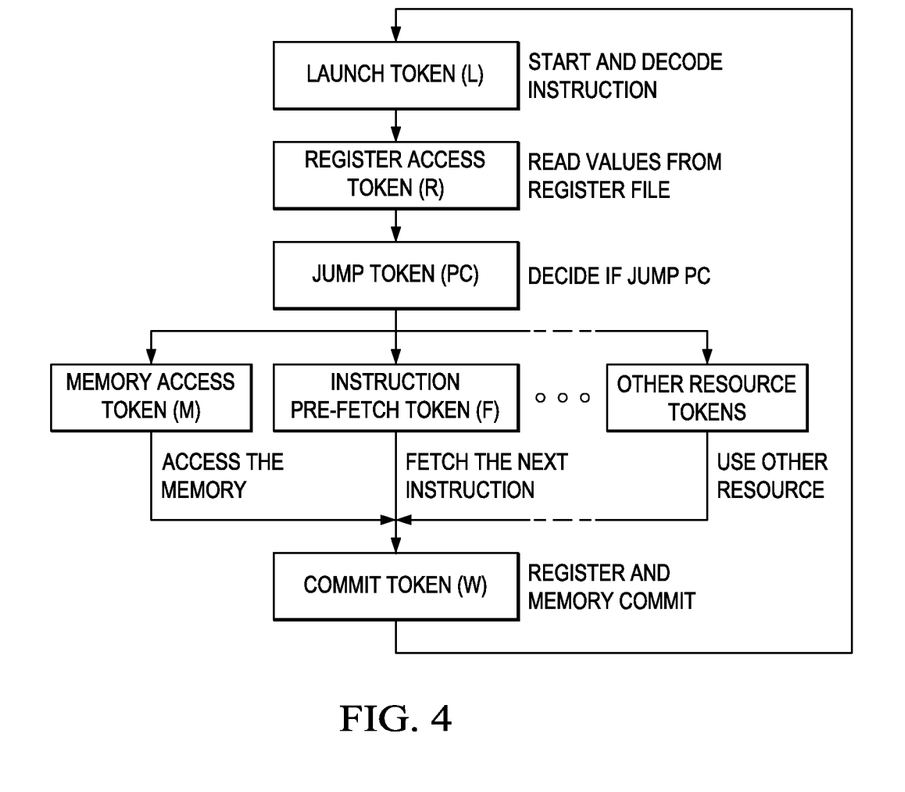
FIG. 4 illustrates token based pipelining with gating within an arithmetic and logic unit (ALU)

FIG. 4 illustrates token based pipelining with gating within an ALU, also referred to herein as token based pipelining for an intra-ALU token gating system. According to this pipelining, designated tokens are used to gate other designated tokens in a given order of the pipeline. This means when a designated token passes through an ALU, a second designated token is then allowed to be processed and passed by the same ALU in the token ring architecture. In other words, releasing one token by the ALU becomes a condition to consume (process) another token in that ALU in that given order. FIG. 4 illustrates one possible example of token-gating relationship. Specifically, in this example, the launch token (L) gates the register access token (R), which in turn gates the jump token (program counter (PC) token). The jump token gates the memory access token (M), the instruction pre-fetch token (F), and possibly other resource tokens that may be used. This means that tokens M, F, and other resource tokens can only be consumed by the ALU after passing the jump token. These tokens gate the commit token (W) to register or memory. The commit token is also referred to herein as a token for writing the instruction. The commit token in turn gates the launch token. The gating signal from the gating token (a token in the pipeline) is used as input into a consumption condition logic of the gated token (the token in the next order of the pipeline). For example, the launch-token (L) generates an active signal to the register access or read token (R), when L is released to the next ALU. This guarantees that any ALU would not read the register file until an instruction is actually started by the launch-token.

Figure 5:
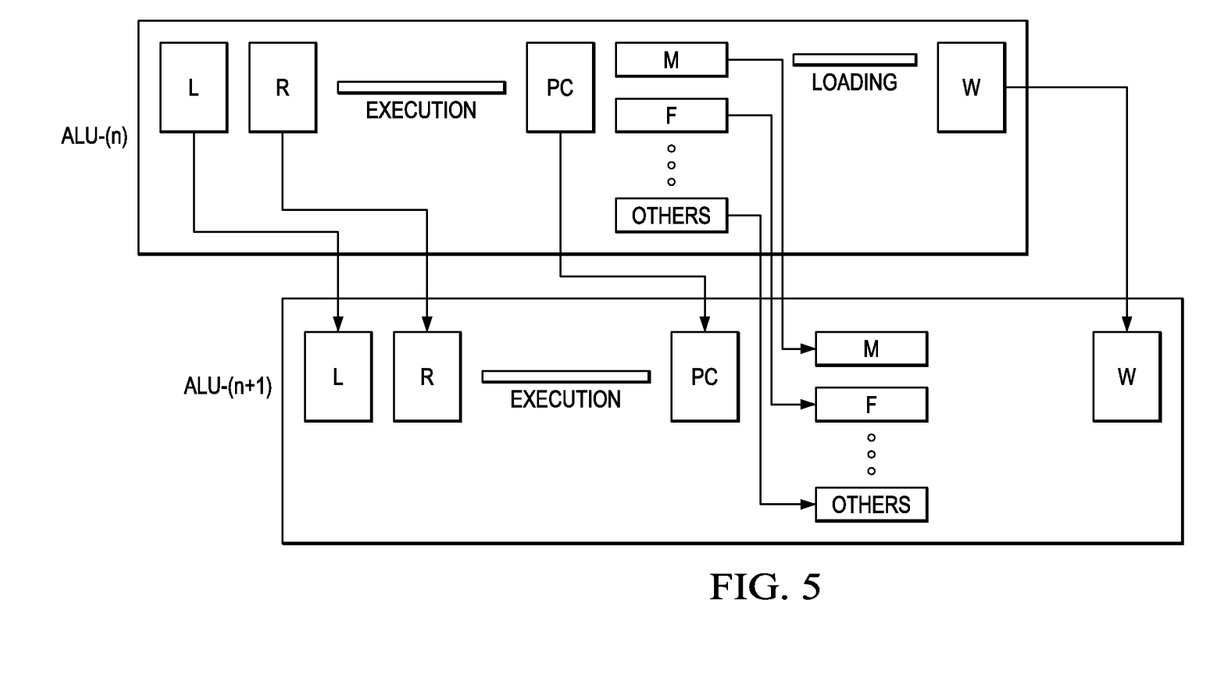
FIG. 5 illustrates token based pipelining with passing between ALUs.

FIG. 5 illustrates token based pipelining with passing between ALUs, also referred to herein as token based pipelining for an inter-ALU token passing system. According to this pipelining, a consumed token signal can trigger a pulse to a common resource. For example, the register-access token (R) triggers a pulse to the register file. The token signal is delayed before it is released to the next ALU for such a period, preventing a structural hazard on this common resource (the register file) between ALU-(n) and ALU-(n+1). The tokens preserve multiple ALUs from launching and committing (or writing) instructions in the program counter order, and also avoid structural hazard among the multiple ALUs.

Figure 6:
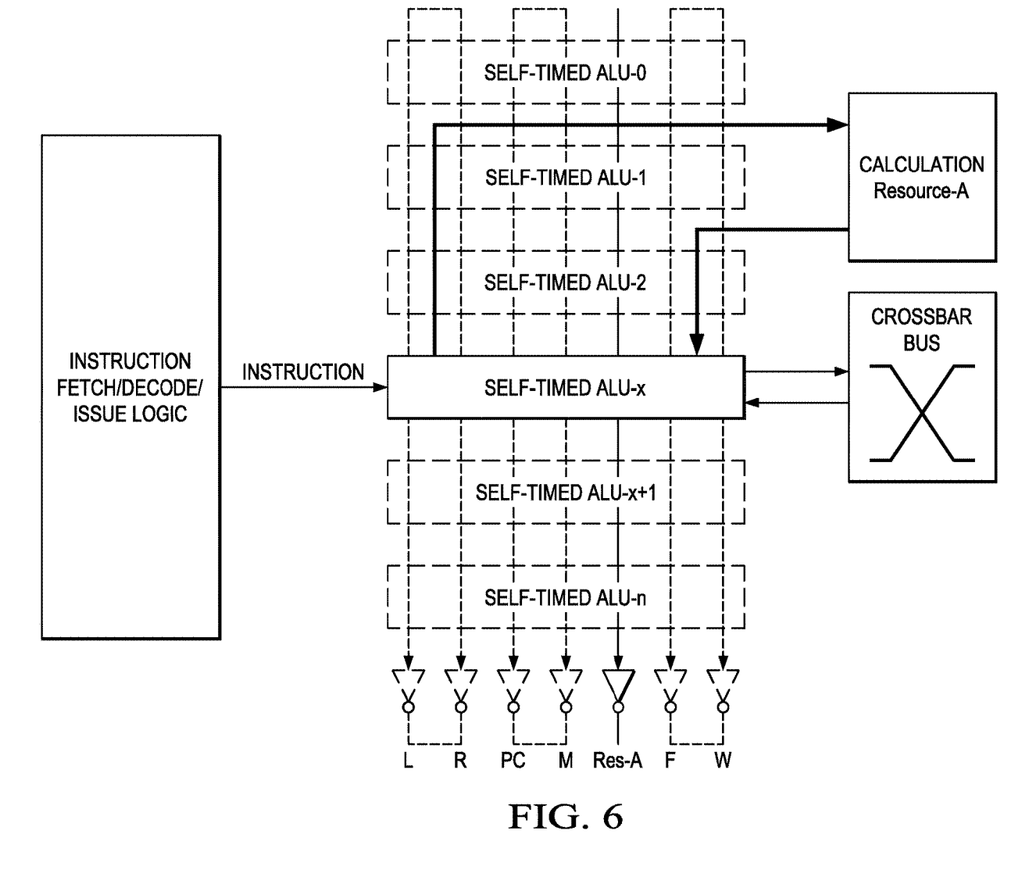
FIG. 6 illustrates a shared resource accessed by an ALU in a homogenous processor.

FIG. 6 illustrates how a shared resource is accessed by an ALU in a homogenous processor according to the token-based pipeline scheme described herein. As shown, the ALU-x receives an instruction, from fetch/decode/issue logic, requiring the use of calculation resource A, and then waits to receive the appropriate token. Upon reception, the ALU-X consumes the token, sends required operands to calculation resource A and begins to perform the instruction. Once the calculation function is complete, calculation resource A sends back the result to ALU-X. The ALU-X may need to wait for and consume various other tokens in order to perform the instruction. For instance, the action of writing the value to the crossbar may require the ALU-X to wait for and consume a write token. The resources allocated by the token-based pipeline may be shared resources that are located externally to the ALUs, and may be referred to as cloud resources. In the case an ALU in the homogeneous processor receives a "special" instruction that requires an operation not supported by the ALU, an external resource supporting such operation is typically used instead.

Figure 7:
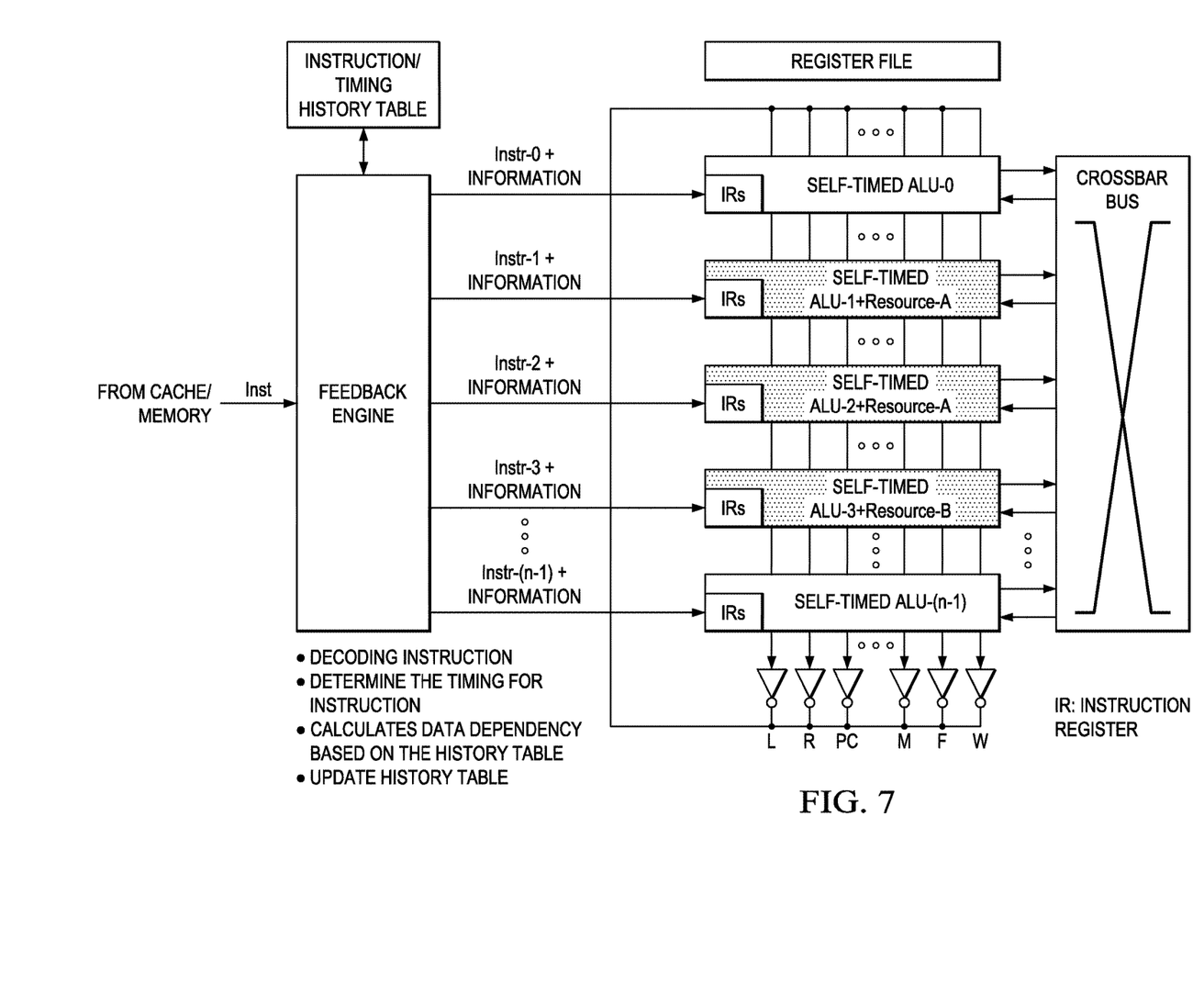
FIG. 7 illustrates an embodiment of a heterogeneous processor architecture which includes both basic ALUs and advanced function ALUs.

FIG. 7 illustrates an embodiment of a heterogeneous processor architecture which includes both basic ALUs and advanced function ALUs. The ALUs are arranged in a token ring architecture similar to the architecture of FIG. 3. The processor of FIG. 7 also includes a feedback engine, an instruction/timing history table accessible by the feedback engine, a register (memory) accessible by the ALUs, and a crossbar bus for exchanging needed information between all the ALUs. These components can be configured similar to their counterparts in the homogenous processor architecture. The basic ALUs include ALU-0 and ALU-(n−1) which are ALUs configured to provide basic arithmetic computation and/or logic computation. The advanced function ALUs include ALU-1, ALU-2, and ALU-3. The advanced function ALUs can have different or additional functions. For example, ALU-1 and ALU-2 have less restricted access to one or more first resources, e.g., resource-A, while ALU-3 has less restricted access to one or more second resources, e.g., resource-B. As such, ALU-1 and ALU-2 may be capable of swiftly and efficiently performing instructions/functions that use resource-A, while ALU-3 may be capable of swiftly and efficiently performing instructions/functions that use resource-B. Accordingly, the fetch/decode/issue logic may preferentially issue instructions to the advanced function ALUs that require those resources. The result is an overall improvement in processing time (reduction in latency) since instructions can be targeted when issued to take advantage of the advanced function ALUs.

Figure 8:
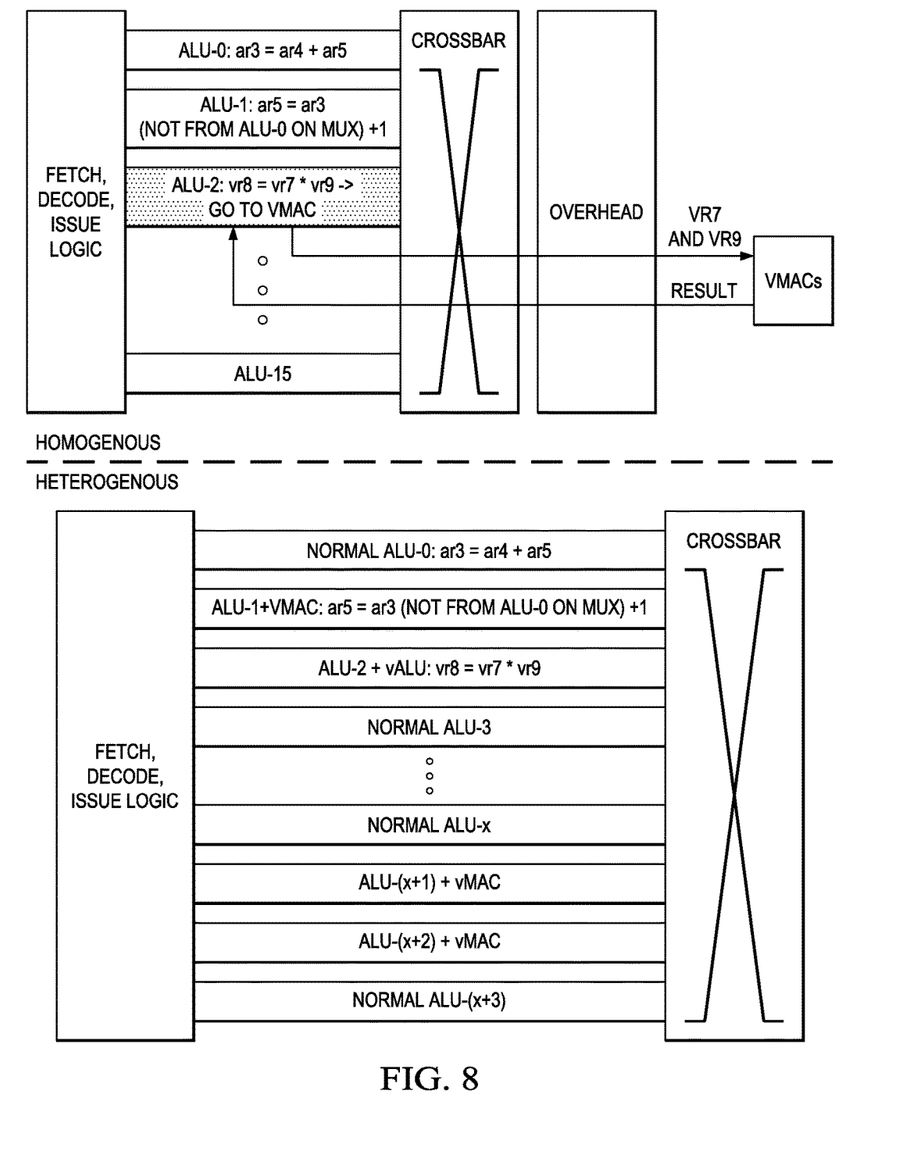
FIG. 8 illustrates differences between a homogenous processor architecture and a heterogeneous processor architecture.

FIG. 8 illustrates differences between a homogenous processor architecture and a heterogeneous processor architecture. For instance, the basic ALU (e.g., ALU-2) in the homogenous processor architecture accesses an external special resource, for example, vector multiplications (VMACs). On the other hand, the advanced function ALU (e.g., ALU-2) in the heterogeneous architecture can access the same resources (VMACs) directly, thereby avoiding latency for sending the operands and results. For instance, the advanced function ALU contains the functionality of the VMAC and therefore does not need a VMAC token or a generation plus mechanism and passing the data. The direct access to such resources saves time.

In embodiments, advanced function ALUs are configured to pull the required data from the crossbar bus and/or register file and write back the result to the crossbar bus. In some embodiments, advanced function ALUs are configured to pull the required data from the crossbar bus and/or register file without consuming read/write tokens. This may allow the advanced function ALUs to efficiently exchange data with the crossbar bus, in comparison with basic ALUs to use external calculation resources. In some embodiments, one or more ALUs in a heterogeneous processor architecture are fed a special instruction to behave as advanced function ALUs. If the ALUs are not fed the special instruction, then they behave as basic ALUs. Alternatively, the ALUs are fed a basic instruction to behave as standard ALUs. In embodiments, a static or dynamic scheduler can be configured to schedule instruction that require specific resources to the advanced function ALUs that have less restricted access to such resources. In some embodiments, a static or dynamic scheduler can be configured to schedule instruction that require faster processing time and access or specific resource to the advanced function ALUs that have less restricted or higher priority access to such resources.

The system and method embodiments herein are described in the context of an ALU set in the asynchronous processor. The ALUs serve as instruction processing units that perform calculations and provide results for the corresponding issued instructions. However in other embodiments, the processor may comprise other instruction processing units instead of the ALUs. The instruction processing units may be referred to sometimes as execution units (XUs) or execution logics, and may have similar, different or additional functions for handling instructions than the ALUs described above. At least some of the XUs in the processor have advanced functions, such as in terms of less restricted or unrestricted access to calculation resources, as described for the advanced function ALUs above. In general, the system and method embodiments described herein can apply to any instruction XUs arranged in accordance with the asynchronous heterogeneous architecture above.

Figure 9:
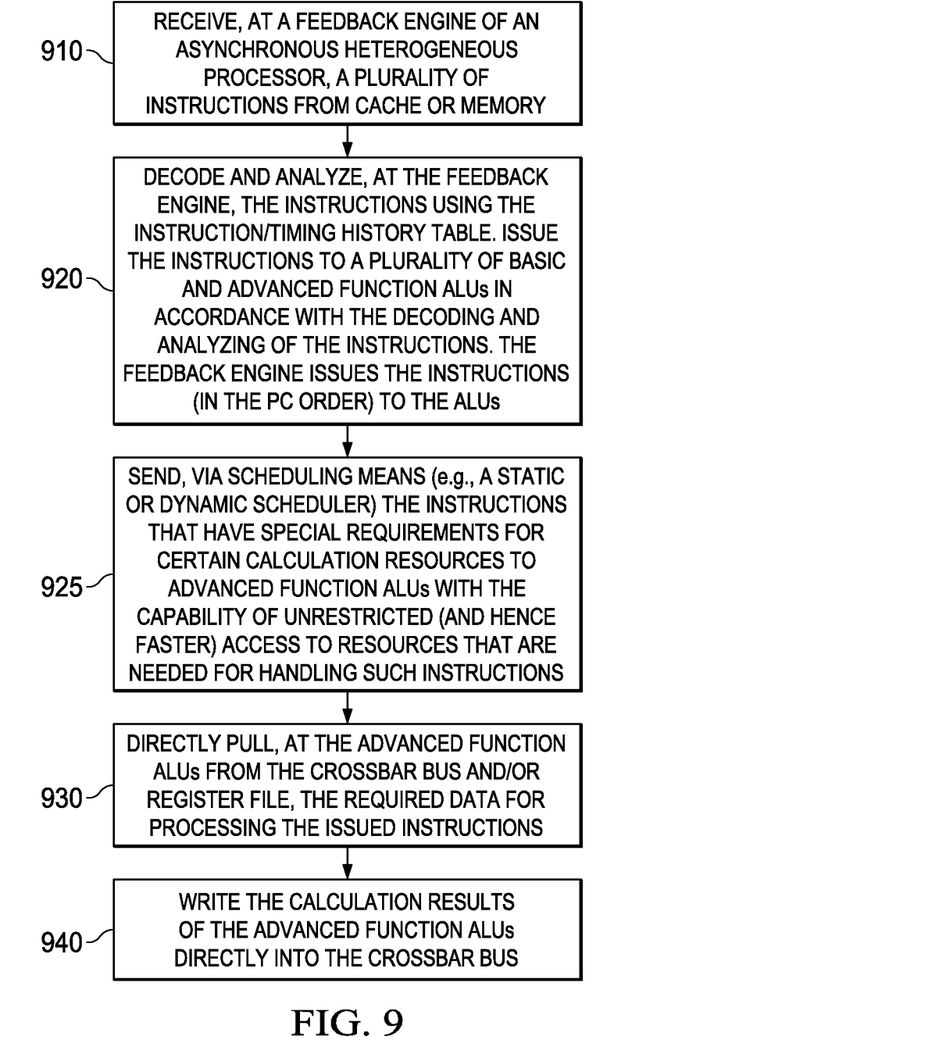
FIG. 9 illustrates an embodiment of a method applying a heterogeneous asynchronous processor.

FIG. 9 illustrates an embodiment of a method applying a heterogeneous asynchronous processor. At step 910, a feedback engine of the processor receives a plurality of instructions from cache or memory. At step 920, the feedback engine decodes and analyzes the instructions using the instruction/timing history table and issues the instructions to a plurality of basic and advanced function processors in accordance with the decoding and analyzing of the instructions. The feedback engine issues the instructions (in the PC order) to the ALUs, e.g., At step 925, the instructions that have special requirement for certain calculation resources are sent via scheduling means, e.g., a static scheduler (a compiler) or dynamic scheduler (a scheduler unit), to advanced function ALUs with the capability of less restricted or unrestricted (and hence faster) access to resources that are needed for handling such instructions. At step 930, the advanced function ALUs pull directly from the crossbar bus and/or register file the required data for processing their issued instructions. At step 940, the advanced function ALUs write results of their calculations directly into the crossbar bus.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by an asynchronous processor, the method comprising:
   receiving, by fetch/decode/issue logic of the asynchronous processor, a plurality of instructions from a memory, the plurality of instructions being decoded by the fetch/decode/issue logic;
   issuing a first instruction from the decoded plurality of instructions to a first execution unit (XU) having computation capability and logic, the first XU using a pre-defined token gating and passing logic to indirectly access a first resource for processing the first instruction; and
   sending, via a scheduler, a second instruction from the decoded plurality of instructions to an advanced function XU, the second instruction instructing the advanced function XU to directly access a second resource to process the second instruction without using the pre-defined token gating and passing logic, the second resource being one of a register file or a crossbar bus.

2. The method of claim 1 further comprising analyzing, at the fetch/decode/issue logic, the plurality of instructions using an instruction and timing history table, wherein the first instruction is issued to the first XU in accordance with a program counter (PC) of the instructions.

3. The method of claim 1 further comprising scheduling the first XU to indirectly access the first resource using the pre-defined token gating and passing logic.

4. The method of claim 1, wherein the first XU is an arithmetic and logic unit (ALU) configured to provide arithmetic or logic computation, and wherein the advanced function XU is an advanced function ALU with direct access to the second resource.

5. The method of claim 1, wherein the scheduler is one of a scheduler unit in the asynchronous processor or a compiler of the instructions.

6. The method of claim 1, further comprising issuing, to a third ALU, a third instruction from the plurality of instructions, the third ALU using pre-defined token gating and passing logic to indirectly access the second resource for processing the third instruction.

7. A method performed by an asynchronous processor, the method comprising:
   issuing a first decoded instruction from a plurality of instructions to a first arithmetic and logic unit (ALU) configured for arithmetic or logic computation, the first ALU using a pre-defined token gating and passing logic to indirectly access a first resource for processing the first decoded instruction;
   sending, via a scheduler, a second decoded instruction from the plurality of instructions to an advanced function ALU, the second decoded instruction instructing the advanced function ALU to directly access a second resource to process the second decoded instruction without using the pre-defined token gating and passing logic; and
   issuing a third decoded instruction from the plurality of instructions to a third ALU, the third ALU using the pre-defined token gating and passing logic to indirectly access the second resource for processing the third decoded instruction.

8. The method of claim 7 further comprising:
   sending, via the scheduler, a third decoded instruction from the plurality of instructions to the advanced function ALU, the third decoded instruction causing the advanced function ALU to directly access a third resource to process the third decoded instruction without using the pre-defined token gating and passing logic, the third decoded instruction being a special type of instruction.

9. The method of claim 7 further comprising:
   issuing, to the advanced function ALU, a third decoded instruction from the plurality of instructions, the third decoded instruction causing the advanced function ALU to indirectly access a third resource to process the third decoded instruction using a pre-defined token gating and passing logic, the the third decoded instruction being a basic type of instruction.

10. The method of claim 7 further comprising:
    issuing, to a third ALU, a third decoded instruction from the plurality of instructions, the third ALU using the pre-defined token gating and passing logic to indirectly access a third resource for processing the third decoded instruction.

11. The method of claim 7, wherein the second resource is one of a register file or a crossbar bus.

12. An apparatus for an asynchronous processor comprising:
    a memory configured to cache instructions;

a first execution unit (XU) configured to process a first instruction cached in the memory, wherein the first XU indirectly accesses a first resource to process the first instruction using a pre-defined token gating and passing logic;

an advanced function XU having direct access to a second resource of the asynchronous processor and configured to process, without using the pre-defined token gating and passing logic, a second instruction cached in the memory with a reduction in latency, wherein the second instruction requires access to the second resource, and wherein the second resource is one of a register file or a crossbar bus; and fetch/decode/issue logic configured to decode the first instruction and the second instruction, and issue the first instruction to the first XU.

13. The apparatus of claim 12 further comprises a scheduler configured to send the second instruction to the advanced function XU.

14. The apparatus of claim 12, wherein the first XU is configured to indirectly access the first resource by consuming a token in accordance with a pre-defined token gating and passing logic.

15. The apparatus of claim 12, wherein the first XU is an arithmetic and logic unit (ALU) configured to provide the arithmetic or logic computation, and wherein the advanced function XU is an advanced function ALU with direct access to the second resource.

16. The apparatus of claim 12, further comprising a third XU configured to process a third instruction cached in the memory, wherein the third XU indirectly accesses the second resource to process the third instruction using the pre-defined token gating and passing logic.

17. The apparatus of claim 12, further comprising a scheduler configured to send the second instruction from the memory to the advanced function XU.

* * * * *

UNITED STATES PATENT AND TRADEMARK OFFICE
CERTIFICATE OF CORRECTION

PATENT NO. : 10,133,578 B2
APPLICATION NO. : 14/480541
DATED : November 20, 2018
INVENTOR(S) : Ge et al.

It is certified that error appears in the above-identified patent and that said Letters Patent is hereby corrected as shown below:

In the Claims

In Column 8, Line 55, Claim 9, delete "the the third" and insert --the third--.

Signed and Sealed this
Twelfth Day of February, 2019

Andrei Iancu
*Director of the United States Patent and Trademark Office*